United States Patent
Kang et al.

(10) Patent No.: US 10,447,405 B2
(45) Date of Patent: Oct. 15, 2019

(54) OPTICAL RECEIVER WITH OPTICAL DEMULTIPLEXER

(71) Applicant: ELECTRONICS AND TELECOMMUNICATIONS RESEARCH INSTITUTE, Daejeon (KR)

(72) Inventors: Sae-Kyoung Kang, Daejeon (KR); Joon Young Huh, Daejeon (KR); Joon Ki Lee, Daejeon (KR); Jie Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/023,145

(22) Filed: Jun. 29, 2018

(65) Prior Publication Data
US 2019/0103921 A1    Apr. 4, 2019

(30) Foreign Application Priority Data

Sep. 29, 2017  (KR) .................. 10-2017-0127966
Jan. 9, 2018   (KR) .................. 10-2018-0002972

(51) Int. Cl.
*H04B 10/69* (2013.01)
*H04J 14/02* (2006.01)
*H04B 10/67* (2013.01)

(52) U.S. Cl.
CPC ......... *H04B 10/691* (2013.01); *H04B 10/675* (2013.01); *H04B 10/693* (2013.01); *H04J 14/02* (2013.01)

(58) Field of Classification Search
CPC .. H04B 10/691; H04B 10/675; H04B 10/693; H04J 14/02
(Continued)

(56) References Cited

U.S. PATENT DOCUMENTS

| 2014/0169389 A1 | 6/2014 | Kim et al. |
| 2014/0178069 A1 | 6/2014 | Kim et al. |

(Continued)

FOREIGN PATENT DOCUMENTS

| JP | 2017-529552 A  | 10/2017 |
| WO | 2016/199984 A1 | 12/2016 |

OTHER PUBLICATIONS

Toshihide Yoshimatsu et al., "Compact and high-sensitivity 100-Gb/s (4=25Gb/s) APD-ROSA with a LAN-WDM PLC demultiplexer", Dec. 10, 2012, vol. 20, No. 26, Optics Express B393-6398.

*Primary Examiner* — Phong La
(74) *Attorney, Agent, or Firm* — LRK Patent Law Firm

(57) ABSTRACT

An optical receiver includes: an optical demultiplexer to demultiplex an optical signal in which a plurality of wavelengths is multiplexed and divide the optical signal into optical signals corresponding to the plurality of wavelengths, respectively; a reflector to change a progress direction of the divided optical signals; an optical coupling lens including, in an array form, light transmission lenses through which the divided optical signals are transmitted, respectively; a plurality of photodetectors to mount on a photodiode (PD) substrate provided on the optical coupling lens, receive the divided optical signals that are transmitted through the light transmission lenses of the optical coupling lens, respectively, and convert the received optical signals to electrical signals; and a plurality of trans impedance amplifiers provided at desired intervals to electrically connect to the plurality of photodetectors through wire bonding and amplify the received plurality of electrical signals to be a desired magnitude.

12 Claims, 7 Drawing Sheets

(58) Field of Classification Search
USPC .......................................................... 370/480
See application file for complete search history.

(56) References Cited

U.S. PATENT DOCUMENTS

| | | |
|---|---|---|
| 2014/0346323 A1 | 11/2014 | Fujimura et al. |
| 2015/0304038 A1* | 10/2015 | Schemmann .... H04B 10/25751 398/72 |
| 2015/0304064 A1* | 10/2015 | Mutalik .............. H04J 14/0221 398/48 |
| 2017/0031100 A1* | 2/2017 | Yang ........................ G02B 6/28 |
| 2017/0082808 A1 | 3/2017 | Oishi |
| 2017/0126315 A1* | 5/2017 | Saito .................. H04B 10/6931 |
| 2018/0120507 A1* | 5/2018 | Kang ................... G02B 6/4224 |
| 2018/0306987 A1* | 10/2018 | Li ........................ G02B 6/4246 |
| 2018/0351684 A1* | 12/2018 | Osenbach ............... H04J 14/06 |

* cited by examiner

OPTICAL RECEIVER WITH OPTICAL DEMULTIPLEXER

CROSS-REFERENCE TO RELATED APPLICATION(S)

This application claims the priority benefit of Korean Patent Application No. 10-2017-0127966, filed on Sep. 29, 2017, and Korean Patent Application No. 10-2018-0002972, filed on Jan. 9, 2018, in the Korean Intellectual Property Office, the disclosures of which are incorporated herein by reference for all purposes.

BACKGROUND

1. Field

At least one example embodiment relates to an optical receiver including an optical demultiplexer, and more particularly, to a device that may enhance a thermal noise characteristic and thereby enhance a reception performance by thermally separating a light receiving element and a trans impedance amplifier (TIA).

2. Description of Related Art

In an optical communication system, a key functional block includes an optical transmitter configured to convert an electrical signal to an optical signal and an optical receiver configured to convert the optical signal to the electrical signal. As an amount of data to be transmitted increases, a wavelength division multiplexing (WDM) transmission scheme of multiplexing a plurality of wavelengths included in a signal to a single optical fiber and transmitting the signal with the multiplexed wavelengths is applied to such an optical transceiver. The WDM transmission scheme has been introduced to a periodic transmission network and to a short-range Ethernet transmission field. Currently, 100G Ethernet signals are transmitted through a single mode optical fiber and a multimode optical fiber.

The optical transmitter converts an electrical signal to an optical signal through a light source having a plurality of wavelengths, and performs wavelength division multiplexing of the optical signal to be a single optical fiber and transmits the multiplexed optical signal through an optical multiplexer. Once the optical signal having the plurality of wavelengths is received, the optical receiver divides the optical signal for each wavelength through an optical demultiplexer, applies the divided optical signal to a photodiode (PD) for each channel, converts the optical signal to an electrical signal, and applies and outputs the converted electrical signal through a trans impedance amplifier (TIA).

In the optical transmission system using the WDM transmission scheme, the optical receiver generally employs a scheme of using a thin film filter and a scheme of using a planar lightwave circuit (PLC) to demultiplex a plurality of wavelengths included in a signal. The optical receiver according to the related art is in an optical reception structure that includes a PLC-based optical demultiplexer, for example, array waveguide grating (AWG), and an avalanche photodiode (APD). Structurally, each optical signal demultiplexed by AWG optically couples with a corresponding light receiving element, that is, the APD through an optical coupling lens in an array form. Here, the optical signal output from the PLC optically couples with the APD vertically. To this end, a substrate, for example, an APD subcarrier, having a planar pattern is required. In the case of the substrate having the planar pattern, a module cost increases due to a complex manufacturing process. Also, heat generated in a TIA chip may increase thermal noise of the light receiving element, that is, the APD, which may lead to degrading the reception performance.

SUMMARY

At least one example embodiment provides a device that may enhance a thermal noise characteristic and thereby enhance a reception performance by thermally separating a light receiving element and a trans impedance amplifier (TIA).

According to an aspect of example embodiments, there is provided an optical receiver comprising an optical demultiplexer configured to demultiplex an optical signal in which a plurality of wavelengths is multiplexed and to divide the optical signal into optical signals corresponding to the plurality of wavelengths, respectively; a reflector configured to change a progress direction of the divided optical signals transferred from the optical demultiplexer; an optical coupling lens including, in an array form, light transmission lenses through which the divided optical signals reflected through the reflector are transmitted, respectively; a plurality of photodetectors configured to mount on a photodiode (PD) substrate provided on the optical coupling lens, to receive the divided optical signals that are transmitted through the light transmission lenses of the optical coupling lens, respectively, and to convert the received optical signals to electrical signals; and a plurality of trans impedance amplifiers provided at desired intervals, and configured to electrically connect to the plurality of photodetectors through wire bonding, and to amplify the plurality of electrical signals received through the plurality of photodetectors to be a desired magnitude. The plurality of photodetectors and the plurality of trans impedance amplifiers are provided on substrates having different thermal conductivities to be thermally separate.

The plurality of trans impedance amplifiers may be mounted on a substrate having a thermal conductivity for emitting a generated heat toward a package of the optical receiver, and the plurality of photodetectors may be mounted on a thermal separation substrate separate from the substrate on which the plurality of trans impedance amplifiers is mounted and having a thermal conductivity for transferring the heat transferred from the package of the optical receiver.

The PD substrate may include a plurality of via-holes through which the optical signals transmitted through the light transmission lenses pass, respectively, and the optical signals passing through the plurality of via-holes are received at the plurality of photodetectors, respectively.

The PD substrate may further include a via-hole for alignment with the optical coupling lens, and the PD substrate and the optical coupling lens may be aligned through the via-hole for alignment with the optical coupling lens and an alignment lens formed on the optical coupling lens.

The PD substrate may be provided as a transparent substrate on which an area allowing the optical signals transmitted through the light transmission lenses to pass is processed with anti-reflection coating, and the optical signals passing through the transparent substrate may be received at the plurality of photodetectors, respectively.

The PD substrate may further include an alignment mark for alignment with the optical coupling lens, and the PD substrate and the optical coupling lens may be aligned through the alignment mark for alignment with the optical coupling lens and an alignment lens formed on the optical coupling lens.

An electrode pattern may be formed on the anti-reflection coating processed area, or formed on the PD substrate corresponding to an area on which anti-reflection coating is removed by removing anti-reflection coating from the area on which the electrode pattern is to be formed.

According to an aspect of at least one example embodiment, there is provided an optical receiver including an optical demultiplexer configured to demultiplex an optical signal in which a plurality of wavelengths is multiplexed and to divide the optical signal into optical signals corresponding to the plurality of wavelengths, respectively; a plurality of photodetectors configured to receive the divided optical signals and to convert the optical signals to electrical signals; and a plurality of trans impedance amplifiers configured to amplify the plurality of electrical signals received through the plurality of photodetectors to be a desired magnitude. The plurality of photodetectors and the plurality of trans impedance amplifiers are provided at desired intervals with respect to each other, configured to electrically connect to each other through wire bonding, and to be thermally separate by providing a substrate on which the plurality of photodetectors is mounted and a substrate on which the plurality of trans impedance amplifiers is mounted to be separate at a desired distance.

The substrate on which the plurality of trans impedance amplifiers is mounted may have a thermal conductivity for emitting a generated heat toward a package of the optical receiver, and the substrate on which the plurality of photodetectors is mounted may be provided at the desired distance from the substrate on which the plurality of trans impedance amplifiers is mounted, and may have a thermal conductivity for blocking the heat transferred from the package of the optical receiver.

The optical receiver may further include a feedthrough configured to output the plurality of electrical signals amplified by the plurality of trans impedance amplifiers to an outside. The plurality of trans impedance amplifiers and the feedthrough may be provided at desired intervals, and electrically connected through wire bonding to be thermally separate.

According to an aspect of at least one example embodiment, there is provided an optical receiver including an optical demultiplexer configured to demultiplex an optical signal in which a plurality of wavelengths is multiplexed and to divide the optical signal into optical signals corresponding to the plurality of wavelengths, respectively; a reflector configured to change a progress direction of the divided optical signals transferred from the optical demultiplexer; an optical coupling lens including, in an array form, light transmission lenses through which the divided optical signals reflected through the reflector are transmitted, respectively; a plurality of photodetectors configured to mount on a photodiode (PD) substrate provided on the optical coupling lens, to receive the divided optical signals that are transmitted through the light transmission lenses of the optical coupling lens, respectively, and to convert the received optical signals to electrical signals; and a plurality of trans impedance amplifiers configured to amplify the plurality of electrical signals received through the plurality of photodetectors to be a desired magnitude. The PD substrate may include a plurality of via-holes through which the optical signals transmitted through the light transmission lenses pass, respectively, or may be provided as a transparent substrate on which an area allowing the optical signals transmitted through the light transmission lenses to pass is processed with anti-reflection coating.

The plurality of trans impedance amplifiers may be mounted on a substrate having a thermal conductivity for emitting a generated heat toward a package of the optical receiver, and the plurality of photodetectors may be mounted on a thermal separation substrate separate from the substrate on which the plurality of trans impedance amplifiers is mounted and having a thermal conductivity for transferring the heat transferred from the package of the optical receiver.

The PD substrate may further include a via-hole for alignment with the optical coupling lens, and the PD substrate and the optical coupling lens may be aligned through the via-hole for alignment with the optical coupling lens and an alignment lens formed on the optical coupling lens.

The PD substrate may further include an alignment mark for alignment with the optical coupling lens, and the PD substrate and the optical coupling lens may be aligned through the alignment mark for alignment with the optical coupling lens and an alignment lens formed on the optical coupling lens.

An electrode pattern may be formed on the anti-reflection coating processed area, or formed on the PD substrate corresponding to an area on which anti-reflection coating is removed by removing anti-reflection coating from the area on which the electrode pattern is to be formed.

The optical signals divided through the optical demultiplexer to be transmitted toward the light transmission lenses, respectively, may have a parallel-beam form, or a form of a beam emitted based on a refractive index of each of an interface of an emission portion of the optical demultiplexer and an external medium.

According to some example embodiments, it is possible to enhance a thermal noise characteristic and thereby enhance a reception performance by thermally separating a light receiving element and a trans impedance amplifier.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
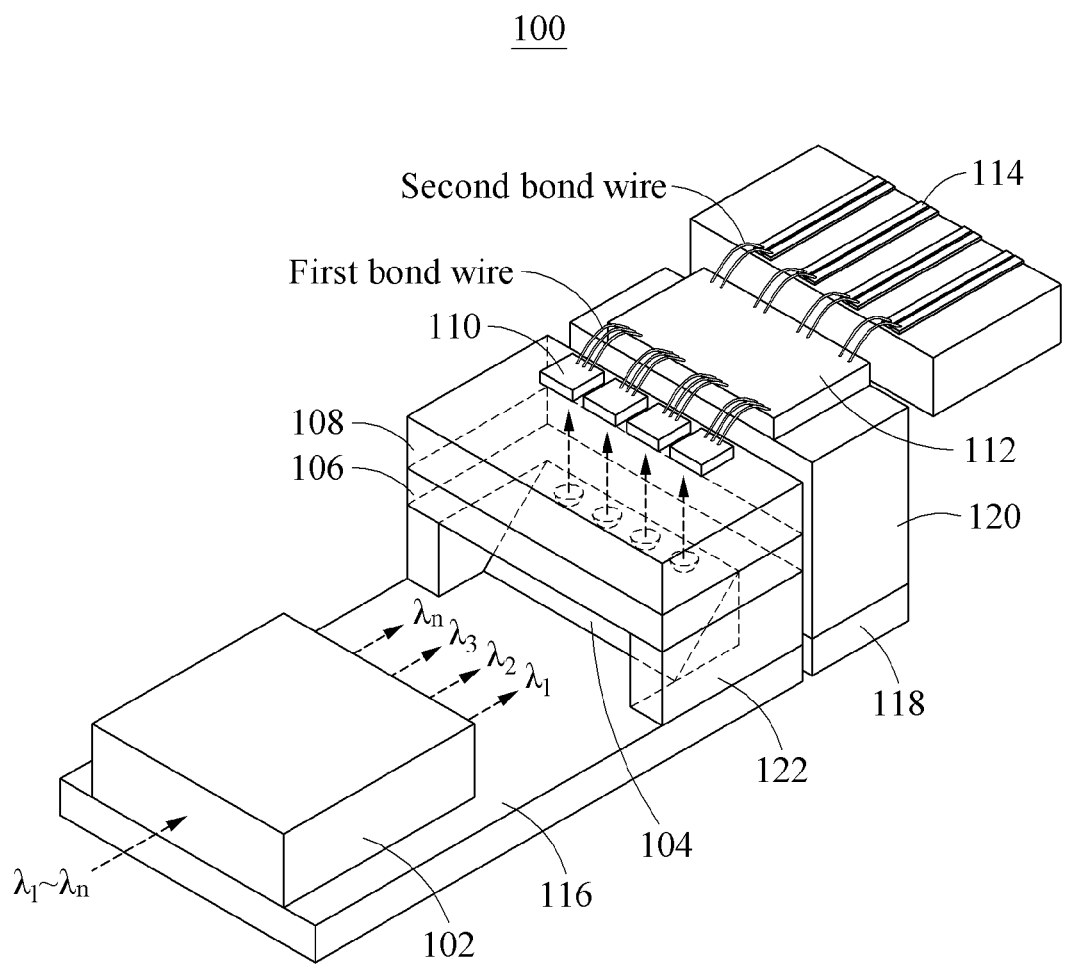
FIG. 1A is a perspective view illustrating an optical receiver according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, example embodiments are described with reference to the accompanying drawings.

Figure 1B:
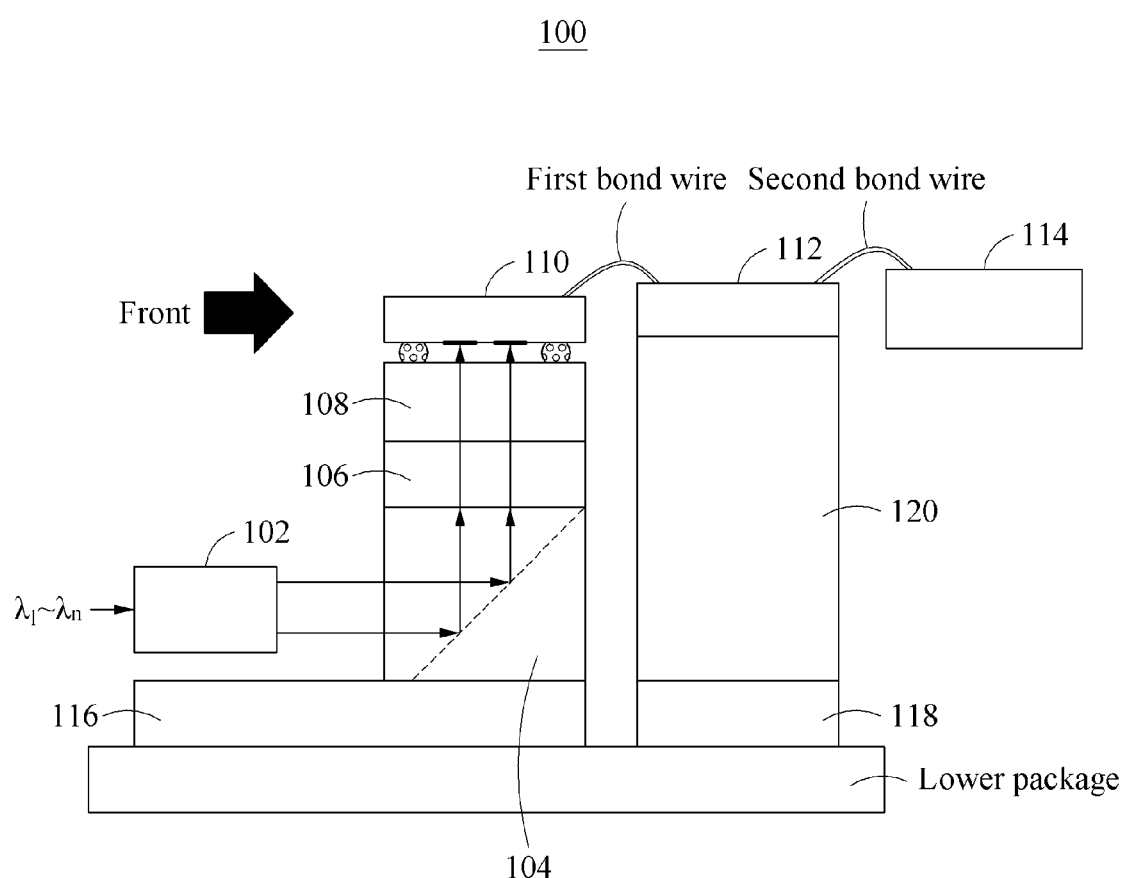
FIG. 1B is a cross-sectional view illustrating an optical receiver according to an example embodiment.

FIGS. 1A and 1B illustrate a structure of an optical receiver according to an example embodiment.

FIG. 1A is a perspective view illustrating an optical receiver according to an example embodiment.

Referring to FIG. 1A, an optical receiver 100 may receive an optical signal in which a plurality of wavelengths is optically multiplexed using a receiver (not shown) of the optical receiver 100. Here, the receiver of the optical receiver 100 may be in an optical fiber connection form for connection of external light, or in a receptacle form for connection of an optical fiber ferrule. The optical signal having the plurality of wavelengths received through the receiver is demultiplexed to optical signals corresponding to the plurality of wavelengths through an optical demultiplexer 102. Each of the demultiplexed optical signals optically couples with a light receiving element, that is, a photodetector (hereinafter, also referred to as a photodiode (PD) 110) corresponding to each channel. The example embodiments relate to a structure of changing an optical path of optical signals output from the optical demultiplexer 102 by 90 degrees and coupling the optical signals with the PDs 110 through an optical coupling lens 106.

FIG. 1B is a cross-sectional view illustrating an optical receiver according to an example embodiment. Referring to FIG. 1B, the optical path of the plurality of optical signals demultiplexed by and output from the optical demultiplexer 102 of the optical receiver 100 may be changed through a reflector 104 such that the plurality of optical signals with the changed optical path may be incident to the optical coupling lens 106 in an array form at an upper end of the reflector 104. Here, a specular surface may be formed on the reflector 104 to change a progress path of an optical signal. A support using silicon, glass, and metal may be attached at a lower end and both sides of the reflector 104 to provide easiness of mounting.

The plurality of optical signals incident to the optical coupling lens 106 may have a parallel-beam form or a form of a beam emitted based on a refractive index each of an interface of an emission portion of the optical demultiplexer 102 and an external medium. Herein, a description is made based on an example in which the plurality of optical signals has the parallel-beam form. Each of the plurality of optical signals converged through the optical coupling lens 106 may be received at the corresponding PD 110. The PD 110 may be mounted at a desired location on a PD substrate 108. Here, the PD 110 may be mounted using a solder, such as AuSn, formed on a bonding pad of the PD substrate 108. The PD substrate 108 on which the PD 110 is mounted may be assembled with the optical coupling lens 106. Here, the PD substrate 108 may be aligned using an alignment lens formed on the optical coupling lens 106. An alignment method may vary based on a type of the PD substrate 108. In detail, the PD substrate 108 may be a substrate on which a via-hole is formed or an optically transparent substrate. An alignment method for assembling the PD substrate 108 and the optical coupling lens 106 will be further described with reference to FIGS. 3 and 5.

Each of the plurality of optical signals received at the PD 110 may be converted to an electrical signal and thereby applied to a trans impedance amplifier (TIA) chip 112 through a first bond wire and amplified to be a desired magnitude. Here, the TIA chip 112 may include a number of TIAs corresponding to a number of received optical signals. An electrical signal output from the TIA chip 112 may be connected to a feedthrough 114 of the optical receiver 110 through a second bond wire and transmitted to an outside.

Here, the optical receiver 100 disclosed herein may enhance a thermal noise characteristic and thereby enhance a reception performance by mounting the TIA chip 112 and the PD 110 to be spatially separate from each other at a desired distance instead of mounting the TIA chip 112 and the PD 110 on the same plane or on the same part. Here, the TIA chip 112 corresponds to a main heat generation source, that is, an electronic element, and the PD 110 corresponds to a light receiving element. Additionally, the optical receiver 100 may block heat from coming into the PD 110 through the TIA chip 112 or the package of the optical receiver 100 by applying a thermal separation substrate 116. In detail, the PD 110 may be mounted on the thermal separation substrate 116 and the TIA chip 112 may be mounted on a first substrate 118 provided at a desired distance from the thermal separation substrate 116. Here, the thermal separation substrate 116 may be configured using a relatively low conductive material and thus, may have a relatively high heat blocking performance. Also, the reflector 104, the optical coupling lens 106, and the PD substrate 108 may be configured using a relatively great heat resistance material, that is, a relatively low conductive material. Through this, a thermal path between the TIA chip 112 and the PD 110 may be blocked.

The first substrate 118 may use an insulating material having a relatively high conductivity based on a structure of the optical receiver 100. If a case of the optical receiver 100 and a ground used for the TIA chip 112 are identical, the first substrate 118 may be configured using a material such as a metal. A second substrate 120 may be configured using a gold-plated metal material for mounting the TIA chip 112 and other peripheral passive elements.

Figure 2:
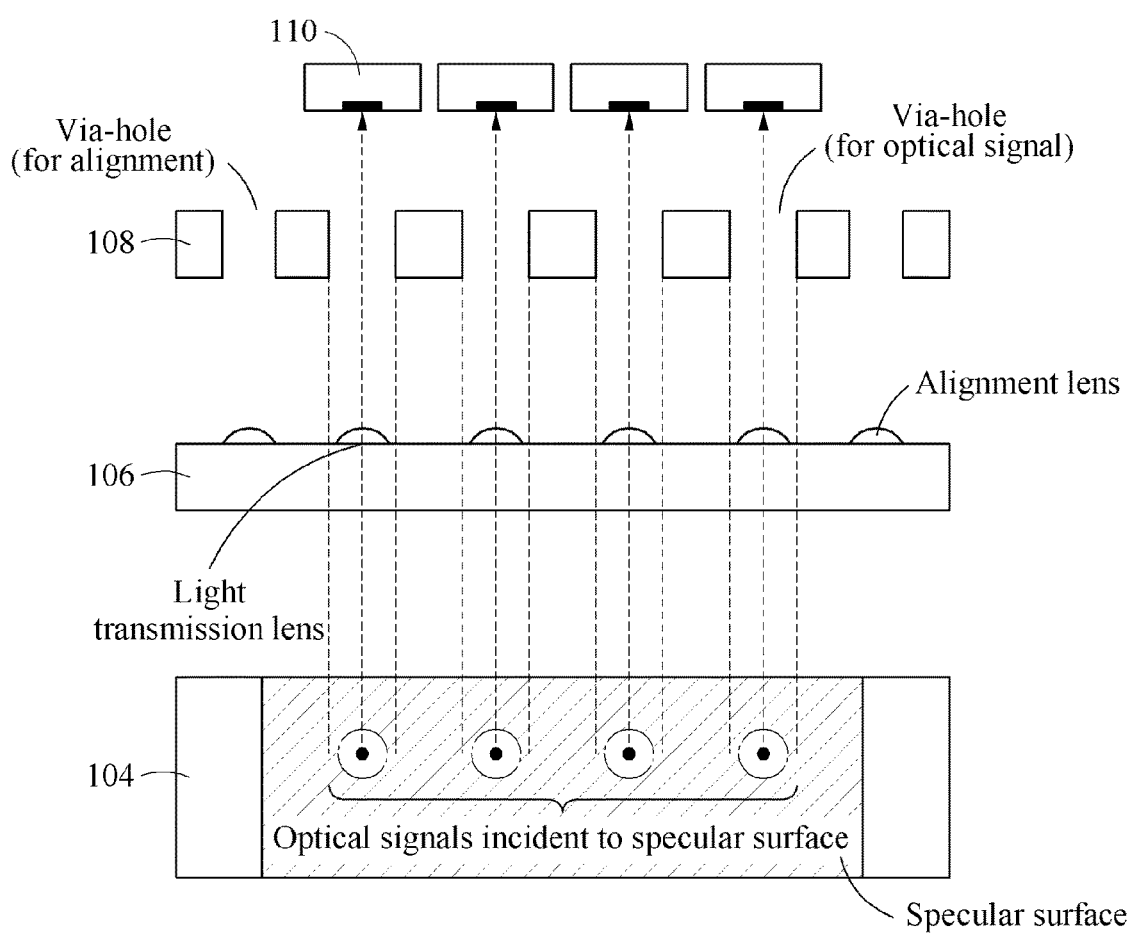
FIG. 2 illustrates a first structure for describing optical coupling of an optical signal in an optical receiver viewed from a front according to an example embodiment.

FIG. 2 illustrates a first structure for describing optical coupling of an optical signal in an optical receiver viewed from a front according to an example embodiment.

Referring to FIG. 2, a via-hole may be formed on the PD substrate 108 of the optical receiver 100. FIG. 2 illustrates an example in which, when the optical receiver 100 is viewed in a front direction of FIG. 1B, that is, a direction in which an optical signal is incident, a wavelength-by-wavelength optical signal incident on the specular surface of the reflector 104 is vertically reflected in a 90-degree direction and optically couples with the corresponding PD 110 through the optical coupling lens 106 and the PD substrate 108.

Each of the plurality of optical signals transmitted through light transmission lenses of the optical coupling lens 106, respectively, may be applied to the corresponding PD 110 by passing through a corresponding via-hole of the PD substrate 108. The via-hole of the PD substrate 108 may be formed using a physical or chemical method based on a material used for a substrate. For example, if a silicon wafer is used for the PD substrate 108, a hole that passes through top and bottom surfaces of the PD substrate 108 may be chemically formed through wet etching or dry etching.

Figure 3:
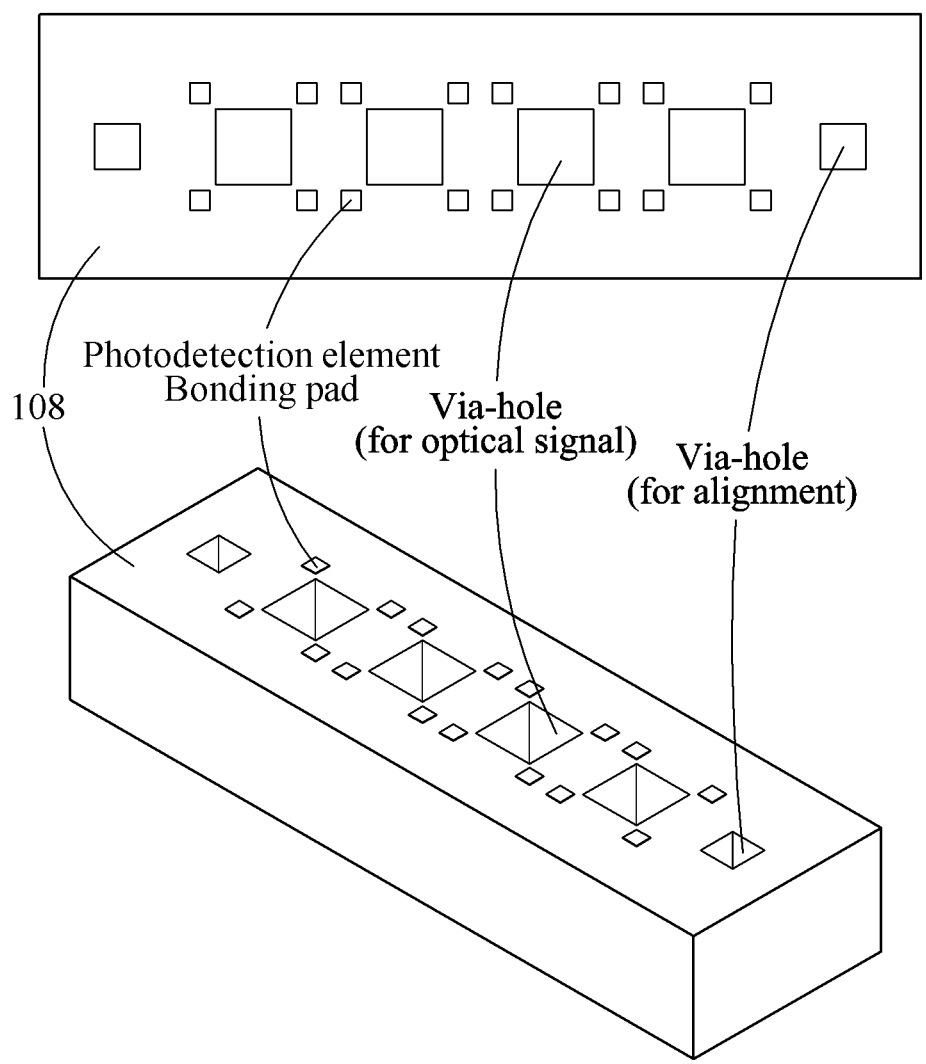
FIG. 3 illustrates a structure of a photodiode (PD) substrate including a via-hole according to an example embodiment.

FIG. 3 illustrates a structure of a PD substrate including a via-hole according to an example embodiment.

Referring to FIG. 3, via-holes may be formed to pass through top and bottom surfaces of the PD substrate 108. Here, the formed via-holes may include a via-hole through which an optical signal passes and an alignment via-hole for alignment between the PD substrate 108 and the optical coupling lens 106.

Referring to FIG. 2, the optical coupling lens 106 may include light transmission lenses in an array form for optical coupling of the plurality of optical signals and an alignment lens for alignment with the PD substrate 108. Here, a lens may be formed on one or both of a surface on which an optical signal is input or a surface from which the optical signal is output in the optical coupling lens 106.

The optical coupling lens 106 and the PD substrate 108 may be assembled through manual alignment using alignment lenses formed on the optical coupling lens 106 and alignment via-holes formed on the PD substrate 108.

Figure 4:
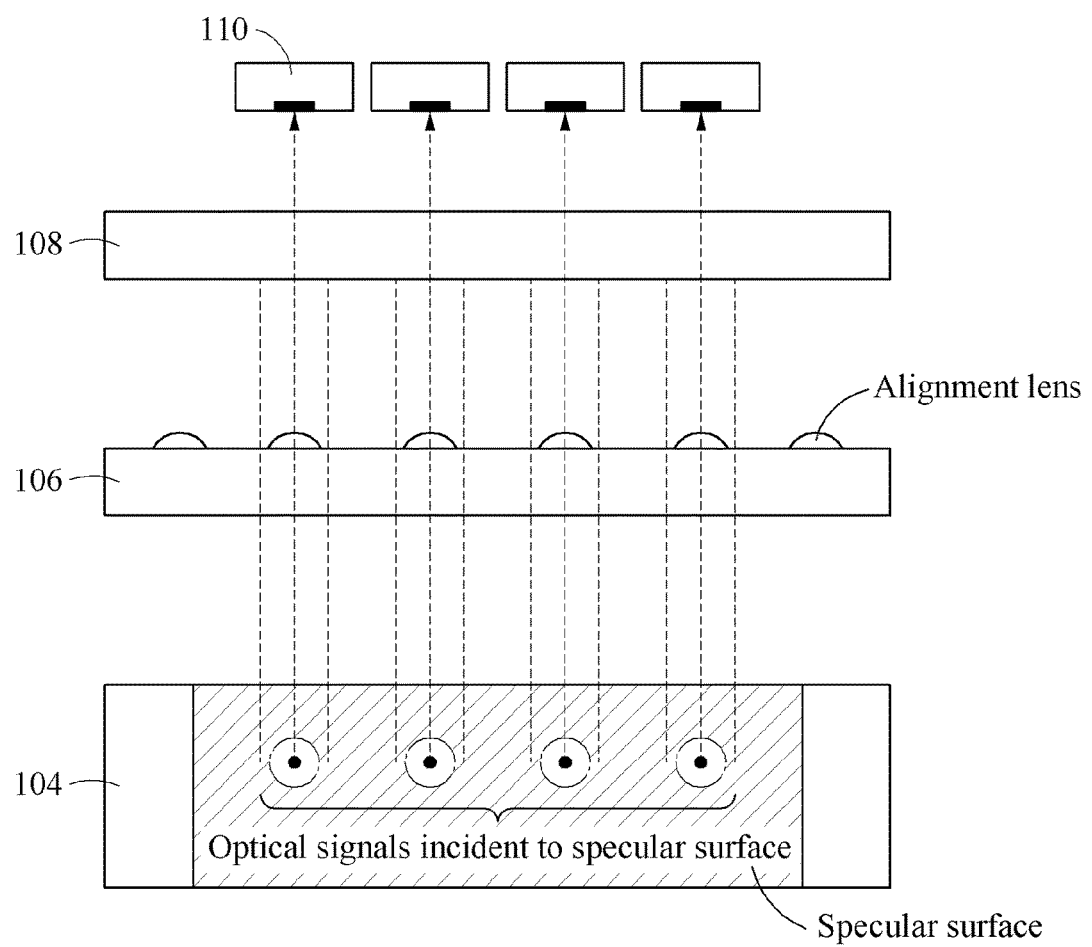
FIG. 4 illustrates a second structure for describing optical coupling of an optical signal in an optical receiver viewed from a front according to an example embodiment.

FIG. 4 illustrates a second structure for describing optical coupling of an optical signal in an optical receiver viewed from a front according to an example embodiment.

Referring to FIG. 4, the PD substrate 108 of the optical receiver 100 may be in a structure of an optically transparent substrate. FIG. 4 illustrates an example in which, when the optical receiver 100 is viewed in a front direction of FIG. 1B, that is, a direction in which an optical signal is incident, a wavelength-by-wavelength optical signal incident to the specular surface of the reflector 104 is vertically reflected in a 90-degree direction and optically couples with the corresponding PD 110 through the optical coupling lens 106 and the PD substrate 108.

Each of the plurality of optical signals transmitted through the light transmission lenses of the optical coupling lens 106, respectively, may be applied to the corresponding PD 110 by passing through the transparent PD substrate 108 without reflection and loss. To this end, anti-reflection coating may be processed on the transparent PD substrate 108 such that an optical signal may pass through the PD substrate 108 without reflection and loss.

Figure 5:
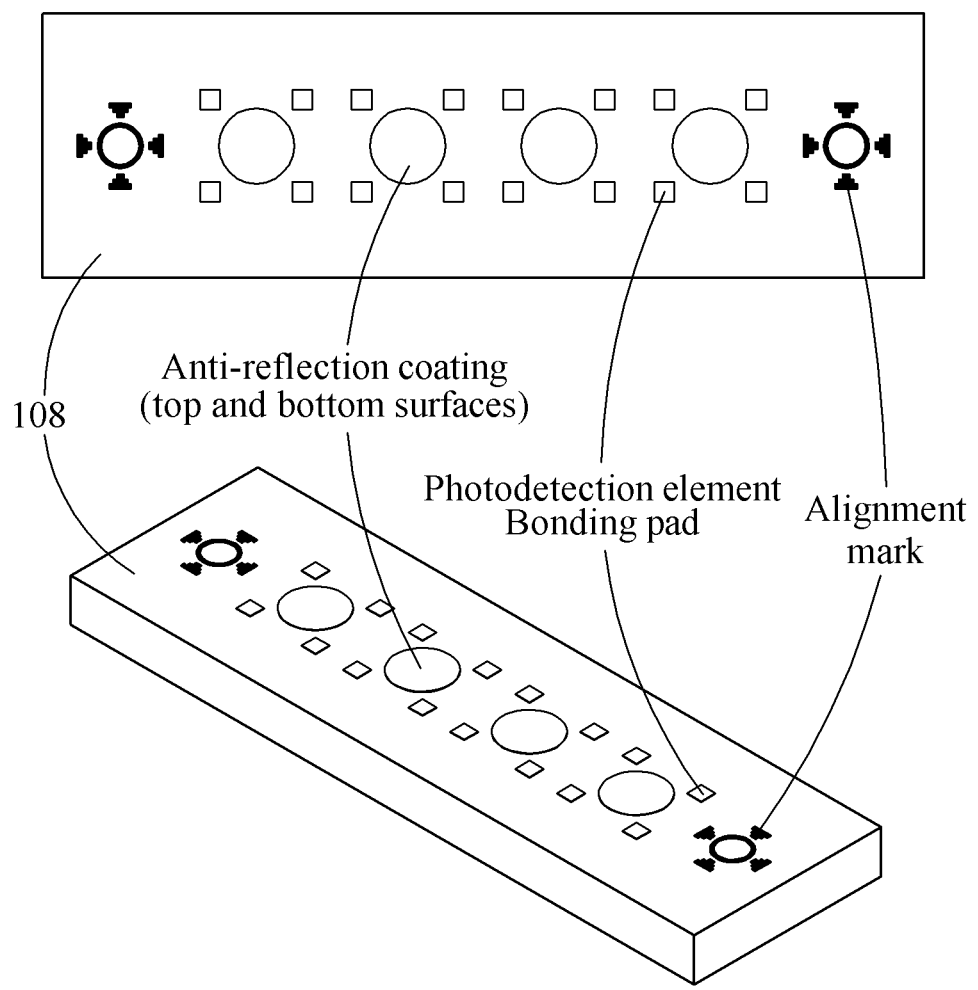
FIG. 5 illustrates a structure of a PD substrate provided as a transparent substrate according to an example embodiment.

FIG. 5 illustrates a structure of a PD substrate provided as a transparent substrate according to at least one example embodiment.

Referring to FIG. 5, anti-reflection coating may be processed on the entire top and bottom surfaces of the PD substrate 108, or may be processed on only an area that allows an optical signal to pass on the PD substrate 108. Also, alignment marks for alignment between the PD substrate 108 and the optical coupling lens 106 may be formed on the PD substrate 108. The optical coupling lens 106 and the PD substrate 108 may be assembled through manual alignment using the alignment lenses formed on the optical coupling lens 106 and the alignment marks formed on the PD substrate 108. As described above, here, the PD substrate 108 is provided as the transparent substrate.

Figure 6A:
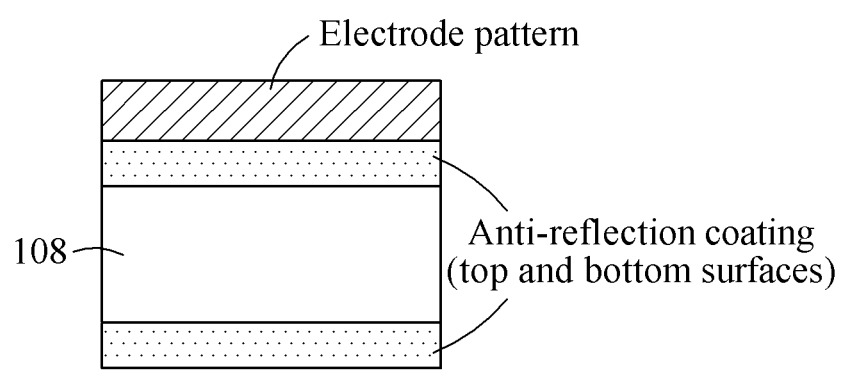
FIGS. 6A and 6B illustrate examples of a method of forming an electrode pattern on a PD substrate provided as a transparent substrate according to an example embodiment.
Figure 6B:
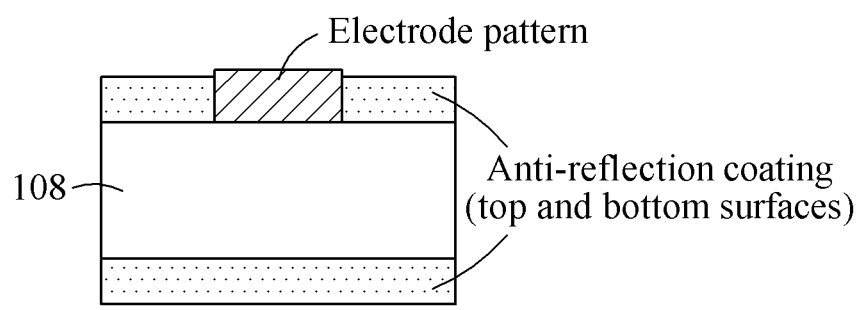

FIGS. 6A and 6B illustrate examples of a method of forming an electrode pattern on a PD substrate provided as a transparent substrate according to an example embodiment.

Referring to FIGS. 6A and 6B, an electrode pattern, for example, a photodetection element bonding pad and an electrical signal electrode pad, may be formed on the PD substrate 108 constituting the optical receiver 100. Here, the PD substrate 108 is provided as the transparent substrate. In this example, the electrode pattern may be formed using two methods. FIG. 6A illustrates a first method of processing anti-reflection coating on both top and bottom surfaces of the PD substrate 108 and directly forming the electrode pattern thereon.

FIG. 6B illustrates a second method of processing anti-reflection coating on both top and bottom surfaces of the PD substrate 108 and then removing anti-reflection coating of an area on which the electrode pattern is to be formed and forming the electrode pattern on the PD substrate 108 on which the anti-reflection coating is removed.

As described above, according to example embodiments, the optical receiver 100 may be provided at relatively low cost by applying a low-cost technique of changing a progress path of an optical signal, instead of applying a high-cost lateral pattern substrate technique. Here, the optical receiver 100 may enhance a thermal noise characteristic of the PD 110 and thereby enhance a reception performance through thermal separation between the PD 110 and the TIA chip 112 corresponding to a main heat generation source.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The example embodiments described herein may be implemented using hardware components, software components, and/or combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical receiver comprising:
    an optical demultiplexer configured to demultiplex an optical signal in which a plurality of wavelengths is multiplexed and to divide the optical signal into optical signals corresponding to the plurality of wavelengths, respectively;
    a reflector configured to change a progress direction of the divided optical signals transferred from the optical demultiplexer;
    an optical coupling lens including, in an array form, light transmission lenses through which the divided optical signals reflected through the reflector are transmitted, respectively;
    a plurality of photodetectors configured to mount on a photodiode (PD) substrate provided on the optical coupling lens, to receive the divided optical signals that are transmitted through the light transmission lenses of the optical coupling lens, respectively, and to convert the received optical signals to electrical signals; and
    a plurality of trans impedance amplifiers provided at desired intervals, and configured to electrically connect to the plurality of photodetectors through wire bonding, and to amplify the plurality of electrical signals received through the plurality of photodetectors to be a desired magnitude,
    wherein the plurality of trans impedance amplifiers is mounted on a first substrate having a thermal conductivity for emitting a heat generated from the plurality of trans impedance amplifiers toward a package of the optical receiver, and
    wherein the plurality of photodetectors is mounted on a second substrate thermally separate from the first substrate.

2. The optical receiver of claim 1, further comprising a feedthrough configured to output the plurality of electrical signals amplified by the plurality of trans impedance amplifiers to an outside,
    wherein the plurality of trans impedance amplifiers and the feedthrough are provided at desired intervals, and are electrically connected through wire bonding to be thermally separate.

3. The optical receiver of claim 1, wherein the PD substrate includes a plurality of via-holes through which the optical signals transmitted through the light transmission lenses pass, respectively, and the optical signals passing through the plurality of via-holes are received at the plurality of photodetectors, respectively.

4. The optical receiver of claim 3, wherein:
the PD substrate further comprises a via-hole for alignment with the optical coupling lens, and
the PD substrate and the optical coupling lens are aligned through the via-hole for alignment with the optical coupling lens and an alignment lens formed on the optical coupling lens.

5. The optical receiver of claim 1, wherein the PD substrate is provided as a transparent substrate on which an area allowing the optical signals transmitted through the light transmission lenses to pass is processed with anti-reflection coating, and the optical signals passing through the transparent substrate are received at the plurality of photodetectors, respectively.

6. The optical receiver of claim 5, wherein:
the PD substrate further comprises an alignment mark for alignment with the optical coupling lens, and
the PD substrate and the optical coupling lens are aligned through the alignment mark for alignment with the optical coupling lens and an alignment lens formed on the optical coupling lens.

7. The optical receiver of claim 5, wherein an electrode pattern is formed on the anti-reflection coating processed area, or formed on the PD substrate corresponding to an area on which anti-reflection coating is removed by removing anti-reflection coating from the area on which the electrode pattern is to be formed.

8. An optical receiver comprising:
an optical demultiplexer configured to demultiplex an optical signal in which a plurality of wavelengths is multiplexed and to divide the optical signal into optical signals corresponding to the plurality of wavelengths, respectively;
a reflector configured to change a progress direction of the divided optical signals transferred from the optical demultiplexer;
an optical coupling lens including, in an array form, light transmission lenses through which the divided optical signals reflected through the reflector are transmitted, respectively;
a plurality of photodetectors configured to mount on a photodiode (PD) substrate provided on the optical coupling lens, to receive the divided optical signals that are transmitted through the light transmission lenses of the optical coupling lens, respectively, and to convert the received optical signals to electrical signals; and
a plurality of trans impedance amplifiers configured to amplify the plurality of electrical signals received through the plurality of photodetectors to be a desired magnitude,
wherein the PD substrate includes a plurality of via-holes through which the optical signals transmitted through the light transmission lenses pass, respectively, or is provided as a transparent substrate on which an area allowing the optical signals transmitted through the light transmission lenses to pass is processed with anti-reflection coating,
wherein the plurality of trans impedance amplifiers is mounted on a first substrate having a thermal conductivity for emitting a heat generated from the plurality of trans impedance amplifiers toward a package of the optical receiver, and
wherein the plurality of photodetectors is mounted on a second substrate thermally separate from the first substrate.

9. The optical receiver of claim 8, wherein:
the PD substrate further comprises a via-hole for alignment with the optical coupling lens, and
the PD substrate and the optical coupling lens are aligned through the via-hole for alignment with the optical coupling lens and an alignment lens formed on the optical coupling lens.

10. The optical receiver of claim 8, wherein:
the PD substrate further comprises an alignment mark for alignment with the optical coupling lens, and
the PD substrate and the optical coupling lens are aligned through the alignment mark for alignment with the optical coupling lens and an alignment lens formed on the optical coupling lens.

11. The optical receiver of claim 8, wherein an electrode pattern is formed on the anti-reflection coating processed area, or formed on the PD substrate corresponding to an area on which anti-reflection coating is removed by removing anti-reflection coating from the area on which the electrode pattern is to be formed.

12. The optical receiver of claim 8, wherein the optical signals divided through the optical demultiplexer to be transmitted toward the light transmission lenses, respectively, have a parallel-beam form, or a form of a beam emitted based on a refractive index each of an interface of an emission portion of the optical demultiplexer and an external medium.

* * * * *